(12) United States Patent  
Hirai (10) Patent No.: US 8,215,846 B2  
(45) Date of Patent: Jul. 10, 2012

(54) WHEEL SUPPORT BEARING ASSEMBLY

(75) Inventor: Isao Hirai, Iwata (JP)

(73) Assignee: NTN Corporation, Osaka (JP)

( * ) Notice: Subject to any disclaimer, the term of this patent is extended or adjusted under 35 U.S.C. 154(b) by 149 days.

(21) Appl. No.: 12/735,706

(22) PCT Filed: Feb. 6, 2009

(86) PCT No.: PCT/JP2009/000457  
§ 371 (c)(1),  
(2), (4) Date: Aug. 10, 2010

(87) PCT Pub. No.: WO2009/101777  
PCT Pub. Date: Aug. 20, 2009

(65) Prior Publication Data  
US 2010/0316319 A1   Dec. 16, 2010

(30) Foreign Application Priority Data

Feb. 13, 2008   (JP) ................................. 2008-031847

(51) Int. Cl.  
*F16C 13/00* (2006.01)
(52) U.S. Cl. .................. 384/544; 384/589; 384/913
(58) Field of Classification Search .................. 384/544, 384/589, 913  
See application file for complete search history.

(56) References Cited

U.S. PATENT DOCUMENTS

| | | |
|---|---|---|
| 2003/0185476 A1 | 10/2003 | Nakamura et al. |
| 2009/0189436 A1 | 7/2009 | Hirai et al. |

FOREIGN PATENT DOCUMENTS

| | | |
|---|---|---|
| EP | 1 731 777 A1 | 12/2006 |
| JP | 2004-314820 | 11/2004 |
| JP | 2005-67430 | 3/2005 |
| JP | 2005-308152 | 11/2005 |
| JP | 2006-241559 | 9/2006 |
| JP | 2006-291250 | 10/2006 |
| JP | 2006-328464 | 12/2006 |
| JP | 2006-329287 | 12/2006 |
| JP | 2006-342902 | 12/2006 |
| JP | 2007-22464 | 2/2007 |
| JP | 2007-50857 | 3/2007 |
| JP | 2007-107647 | 4/2007 |

OTHER PUBLICATIONS

English Translation of the International Preliminary Report on Patentability mailed Sep. 16, 2010 in corresponding International Patent Application PCT/JP2009/000457.  
European Search Report dated Jan. 31, 2011 in corresponding European Patent Application 09710042.4.  
International Search Report for PCT/JP2009/000457, mailed May 12, 2009.

*Primary Examiner* — Thomas R Hannon (57) ABSTRACT

A wheel support bearing assembly includes an outer member (1), which serves as a stationary member and has an inner periphery formed with a plurality of rows of raceway surfaces (3), an inner member (2), which serves as a rotatable member and has an outer periphery formed with respective raceway surfaces (4) opposed to the previously described raceway surfaces (3), and a plurality of rows of rolling elements (5) interposed between the respective opposed raceway surfaces (3, 4). The outer member (1) is thermally refined by means of a quenching and a high temperature tempering process so that a layer of at least 2 mm in depth from a surface of the outer member is rendered to have a micro-pearlite structure.

7 Claims, 8 Drawing Sheets

Fig. 1

OUTBOARD SIDE ← → INBOARD SIDE

WHEEL SUPPORT BEARING ASSEMBLY

CROSS REFERENCE TO THE RELATED APPLICATIONS

This application claims the benefit under 35 U.S.C. Section 371 of PCT International Application No. PCT/JP2009/000457, filed Feb. 6, 2009, which claimed priority to Japanese patent application No. 2008-031847, filed Feb. 13, 2008, the entire disclosures of which are herein incorporated by reference as a part of this application.

FIELD OF THE INVENTION

The present invention relates to a wheel support bearing assembly for use in automotive vehicles and freight cars, which is designed to have a high strength.

BACKGROUND ART

In the conventional wheel support bearing assemblies of the second and third generation types, in which the inner member is utilized as a rotatable member and the outer member as a stationary member, the outer member is generally formed with a vehicle body fitting flange on an outer periphery thereof and, therefore, the use is made of a medium carbon steel such as, for example, S53C as a material for the outer member to thereby secure a required strength. While the raceway surface in the outer member is generally subjected to the induction hardening to thereby secure a required strength in a rolling unit, a portion of the outer member other than the raceway surface is not specifically subjected to any heat treatment and is utilized as forged. The reason therefor is that although the tensile strength will increase if the outer member in its entirety is hardened, it will become fragile against deformation (elongation).

Also, in the outer member employed in the conventional wheel support bearing assemblies of the kind discussed above, emphasis has been placed on the proof strength against the plastic deformation, which takes place under a high load and at a low cycle, rather than the fatigue strength under a low load with a high cycle, since as compared with the inner member, which is the rotatable member, the frequency of repeated load is low.

However, in order to reduce the weight of the automotive vehicle, demands have been made to reduce the weight of the wheel support bearing assembly as well and the functionality comparable to that in the prior art wheel support bearing assembly is required even in the wheel support bearing assembly, which has been assembled compact in size. This equally applies even to the outer member employed in the wheel support bearing assembly and it is quite often that the vehicle body fitting flange is reduced in size and weight (capacity).

To meet those demands, it has been suggested to apply the induction hardening to a root area of the pilot portion in the rotatable member (the hub axle, or the outer member in an outer ring rotating model of the wheel support bearing assembly of the second generation), or to thermally refine the rotatable member in its entirety, so as to increase the fatigue strength of a high stress site during the cornering of the automotive vehicle. (See, for example, the Patent Documents 1, 2 and 3 listed below.)

[Patent Document 1] JP Laid-open Patent Publication No. 2005-308152

[Patent Document 2] JP Laid-open Patent Publication No. 2006-291250

[Patent Document 3] JP Laid-open Patent Publication No. 2004-314820

It is quite frequently observed that the automotive vehicle skids by some reason during the travel thereof with its vehicle wheel (tire, wheel) colliding against the curbside. At this time, an axially acting load may be unexpectedly imposed on the wheel support bearing assembly and a moment load acts thereon. The skidding of the automotive vehicle occurs when the road surface is wetted with rain or is ice covered. When the road surface is ice covered, the atmospheric temperature is low, and when the automotive vehicle then parked in the open air skids to collide against the curbside soon after the start of travel from the parked condition, the load is unexpectedly imposed on the wheel support bearing assembly while the latter is in a cold condition.

Exemplary cases of fracture that occur when the unexpected load acts on the wheel support bearing assembly includes brittle fracture and ductile fracture. In the case of the brittle fracture, the energy that can be absorbed is low and the toughness is low. On the other hand, in the case of the ductile fracture, the energy that can be absorbed is high and the toughness is high. In general when the Charpy impact test is conducted on a steel material, the fracture transition temperature, at which the brittle fracture surface and the ductile fracture surface assume 50% each appears. At temperatures below such transition temperature, the energy that can be absorbed is lower than at temperature above the transition temperature (susceptive to brittle fracture). Where the fracture transition temperature is high, it turns out that the material is low in toughness even at high temperature. On the other hand, if the fracture transition temperature is low, it turns out that the material is high in toughness even at low temperature.

Figure 11:
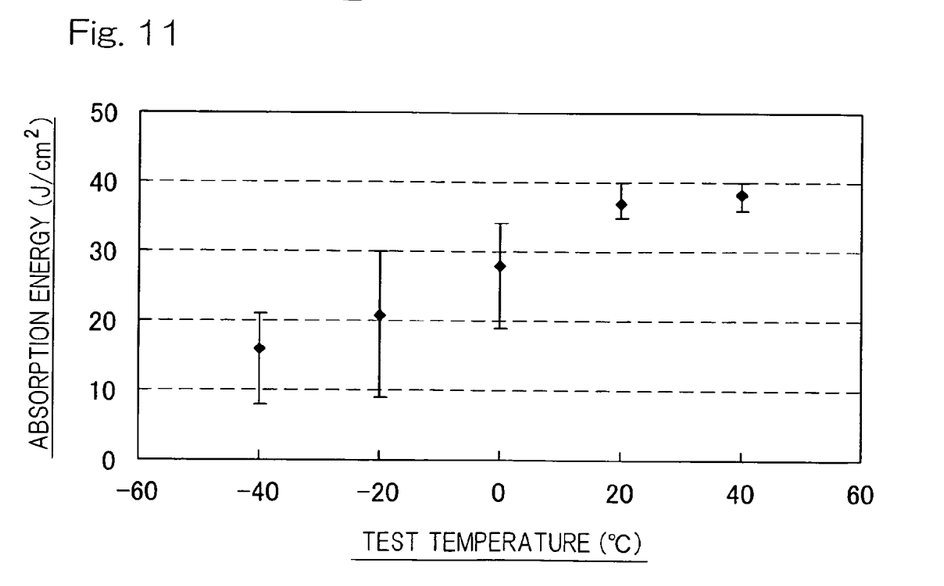
FIG. 11 is a chart showing results of the Charpy impact test.

If, as is the case with the above described wheel support bearing assembly, the carbon steel is used as a material for the outer member and such outer member is used in the form as forged and, particularly, with no heat treatment applied to that portion of the outer member other than the induction heated raceway surfaces, the shock absorption energy at a low temperature (−40 to −20° C.) decreases considerably at a rate higher than that at normal temperatures as shown in the chart of FIG. 11 showing results of the Charpy impact test. Some specific examples of measurements of the absorption energy are shown below and more specific measurements are shown in Table 1.

| | |
|---|---|
| 20° C. | 35 to 40 J/cm$^2$ [N = 6 average: 37.0 J/cm$^2$] |
| −20° C. | 9 to 30 J/cm$^2$ [N = 6 average: 20.8 J/cm$^2$] |
| −40° C. | 8 to 21 J/cm$^2$ [N = 6 average: 15.8 J/cm$^2$] |

TABLE 1

| | | Test Temperature (° C.) | | | | |
|---|---|---|---|---|---|---|
| | | −40 | −20 | 0 | 20 | 40 |
| Absorption Energy (J/cm$^2$) | n = 6 av. | 15.8 | 20.8 | 27.8 | 37.0 | 28.3 |
| | Maximum | 21.0 | 30.0 | 34.0 | 40.0 | 40.0 |
| | Minimum | 8.0 | 9.0 | 19.0 | 35.0 | 36.0 |

It is to be noted that conditions employed during the Charpy impact test are as follows.

2 mm/U notch

For the purpose of imitating the structure after the hot forging, a hot-rolled steel bar made of S53C was held at 1050° C. for 1 hour and was then allowed to stand until it cooled.

A test piece was prepared from a center portion having a quater diameter of the bar of 60 mm in diameter (the longitudinal direction of the test piece conforms to the direction of rolling).

Although the material was carbon steel S53C, two types by different steel makers were used (the test piece was three for each type).

From the above described results of the Charpy impact test, it has been certain that when the impact load acts on the above described wheel support bearing assembly while the latter is in the cold condition, the outer member of the structure as forged is susceptible to the chilled load while the toughness is lowered at the low temperature and, therefore, there is the possibility that the vehicle body fitting flange, which has been made compact and lightweight, will be fractured to such an extent that the wheel support bearing assembly itself may depart from the automotive vehicle.

SUMMARY OF THE INVENTION

Therefore, an object of the present invention is to provide a wheel support bearing assembly in which the outer member has an excellent toughness and in which the load leading to impairment against the impact load can be increased.

The wheel support bearing assembly according to the present invention is a wheel support bearing assembly for rotatably supporting a vehicle wheel relative to a vehicle body structure, which includes an outer member, which serves as a stationary member and has an inner periphery formed with a plurality of rows of raceway surfaces, an inner member, which serves as a ratatable member and has an outer periphery formed with respective raceway surfaces opposed to the previously described raceway surfaces, and a plurality of rows of rolling elements interposed between the respective opposed raceway surfaces, in which the outer member is thermally refined such that a layer of at least 2 mm in depth from a surface of the outer member is rendered to have a micro-pearlite structure. This thermal refinement is a thermal refinement within the strict interpretation and is a refinement accomplished by a quenching and a high temperature tempering process.

When the outer member serving as the stationary member is thermally refined by means of the quenching treatment and the high temperature tempering process, the toughness of the outer member, particularly that exhibited at a low temperature, can be increased. As a result, the resistance characteristic to the impact load can be increased. Namely, the load leading to impairment against the impact load can be increased. In this way, in the event that the automotive vehicle skids and lateral side or vehicle wheels thereof shockingly collide sidewise against the curbside, even though the impact load is loaded on the wheel support bearing assembly, failure of the automotive vehicle to run with the wheel support bearing assembly in its entirety separated from the automotive body structure and the possibility of the vehicle wheel separated and then rolling to collide against an external object can be avoided. Also, since a layer of 2 mm depth from the surface of the outer member represents the micro-pearlite structure, even with the carbon steel having a poor hardenability the toughness of the outer member can be increased due to the presence of the micro-pearlite structure that is excellent in toughness of the surface.

In the present invention, the outer member may have the outer periphery provided with a vehicle body fitting flange, which has female screw holes defined therein for bolting from an inboard side to the vehicle body structure. Even where those female screw holes are provided, the thermal refinement of the outer member is effective to provide an excellent resistance characteristic to the impact load.

In the present invention, the outer member may have the outer periphery provided with a vehicle body fitting flange, which has bolt insertion holes defined therein for bolting from an outboard to the vehicle body structure and a turned surface or a countersunken surface which defines a seat surface of a vehicle body fastening bolt. Even where those bolt insertion holes and seat surfaces turned or countersunken are provided, the thermal refinement of the outer member is effective to provide an excellent resistance characteristic to the impact load.

In the present invention, the outer member may be made of medium carbon steel or a steel material having a chemical composition corresponding to the medium carbon steel and may have the raceway surfaces hardened over a predetermined depth by means of an induction hardening which is effected after turning following the thermal refinement that has been performed subsequent to the hot forging.

In the present invention, the raceway surfaces of the outer member may have a hardness within the range of 58 to 64 HRC and the other portion of the outer member has a hardness within the range of 15 to 35 HRC.

In order that the tensile strength and the crash proofing and the turning capability of the outer member as a product can be compatible with each other, that portion of the outer member other than the raceway surfaces has the hardness preferably within the range of 20 to 30 HRC and more preferably within the range of 20 to 25 HRC.

In the present invention, the rolling elements may be in the form of balls or tapered rollers.

In the present invention, the wheel support bearing assembly may be for supporting either a vehicle drive wheel or a vehicle driven wheel.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

[Reference Numerals]

| | |
|---|---|
| 1 | Outer member |
| 1a | Vehicle body fitting flange |
| 1aa | Turned surface |
| 2 | Inner member |
| 3, 4 | Raceway surface |
| 3a | Hardened layer |
| 5 | Rolling element |
| 14 | Bolt insertion hole |
| 14A | Female screw hole |
| 61 | Knuckle bolt (Vehicle body fastening bolt) |

BEST MODE FOR CARRYING OUT THE INVENTION

A first preferred embodiment of the present invention will be described in detail with particular reference to FIGS. 1 and 2. The wheel support bearing assembly according to this embodiment is a double row angular contact bearing model for use in an automotive vehicle, which is classified as a third generation type, and is an inner ring rotating type for supporting a vehicle drive wheel. It is to be noted that hereinafter in this specification, terms "outboard" and "inboard" represent one side of the vehicle body away from the longitudinal center of the vehicle body and the other side of the vehicle body close to the longitudinal center of the vehicle body, respectively, when assembled in the vehicle body.

Figure 1:
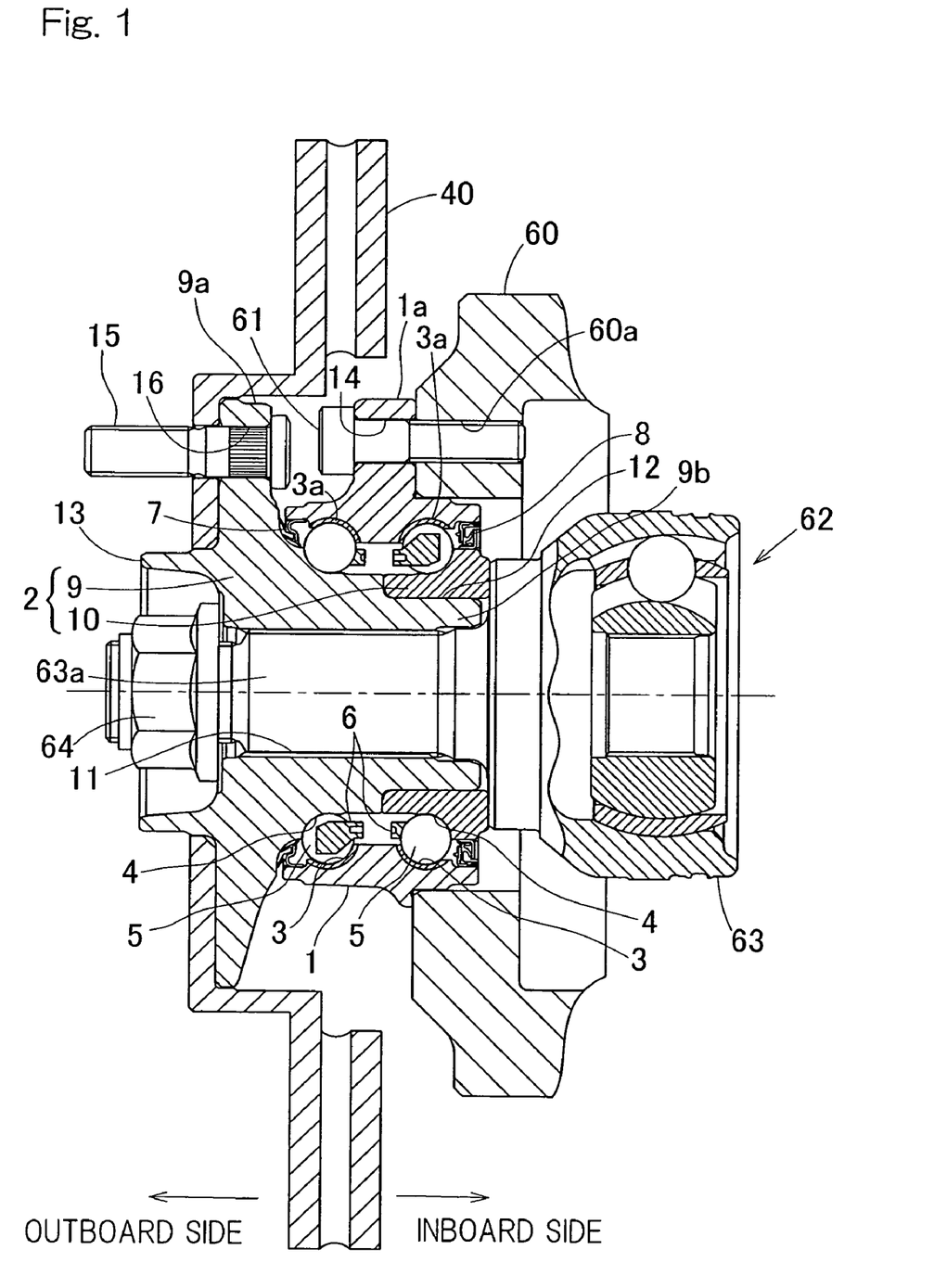
FIG. 1 is a sectional view showing a wheel support bearing assembly according to a first preferred embodiment of the present invention.
Figure 2:
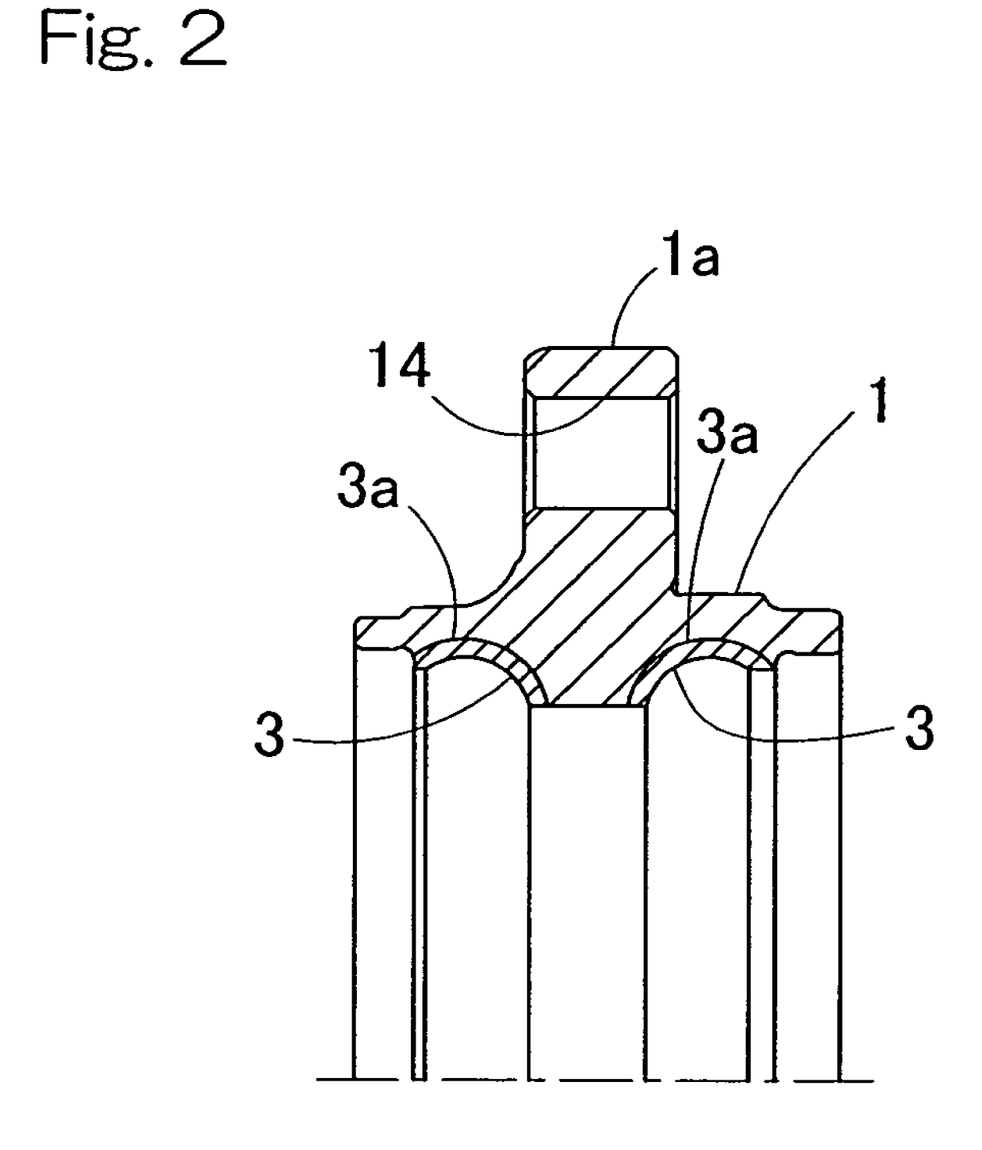
FIG. 2 is a fragmentary enlarged sectional view showing an outer member of the wheel support bearing assembly in FIG. 1.

This wheel support bearing assembly includes, as best shown in FIG. 1 in a sectional representation, an outer member 1 having an inner periphery formed with a plurality of rows of raceway surfaces 3, an inner member 2 having an outer periphery formed with raceway surfaces 4 aligned with the respective raceway surfaces 3, and a plurality of rows of rolling elements 5 interposed between the raceway surfaces 3 in the outer member 1 and the raceway surfaces 4 in the inner member 2. The rolling elements 5 are in the form of balls and are retained by a retainer 6 employed for each row. The raceway surfaces 3 and 4 referred to above have an arcuate shape in cross-section and are so formed as to represent respective rolling element contact angles that are held in back-to-back relation with each other. Opposite open ends of an annular bearing space delimited between the outer member 1 and the inner member 2 are sealed respectively by outboard and inboard sealing units 7 and 8, which form respective sealing devices.

The outer member 1 forms a stationary member and is of one piece construction having an outer periphery formed with a vehicle body fitting flange 1a that is secured to a knuckle 60 forming a part of the automobile suspension system (not shown). The flange 1a is provided with vehicle body fitting bolt insertion holes 14 at a plurality of locations spaced in a direction circumferentially thereof, and this flange 1a is bolted to the knuckle 60 by passing respective knuckle bolts 61, which are vehicle body fastening bolts, through the bolt insertion holes 14 from the outboard side and are then firmly engaged in respective female screw holes 60a defined in the knuckle 60.

The inner member 2 forms a rotatable member and includes a hub axle 9 having an outer periphery formed with a wheel mounting hub flange 9a, and an inner ring 10 mounted on an outer periphery of an inboard end of a shank portion or an axle portion 9b of the hub axle 9. The raceway surfaces 4 one for each row are formed in the hub axle 9 and the inner ring 10, respectively. The inboard end of the hub axle 9 has its outer periphery provided with an inner ring mounting surface area 12 which is radially inwardly stepped to have a small diameter, and the inner ring 10 is mounted on this inner ring mounting surface area 12. The hub axle 9 has a center portion formed with a throughhole 11 defined therein. When a stem portion 63a of an outer ring 63 of a constant velocity universal joint 62 is inserted into this throughhole 11 and, then, the inner member 2 is clamped between a stepped face of the stem portion 63 adjacent a base end thereof and a nut 64 threaded onto a free end, the wheel support bearing assembly and the constant velocity universal joint 62 are connected together. The hub flange 9a is provided with a press-fit hole 16 defined at a plurality of circumferential locations thereof for receiving therein a respective hub bolt 15. At a root portion of the hub flange 9a of the hub axle 9, a cylindrical pilot portion 13 for guiding a brake rotor 40 and a vehicle wheel (not shown) protrudes towards the outboard side. By the guidance of the pilot portion 13, the brake rotor 40 and the vehicle wheel are overlapped to the hub flange 9a and are then fixed in position by the hub bolts 15.

The outer member 1 is made of a medium carbon steel (C=0.45 to 0.80 wt % and, preferably, 0.50 to 0.65 wt %) such as, for example, S53C, or a steel material having a chemical composition corresponding to the medium carbon steel and is thermally refined by means of a quenching treatment and a high temperature tempering process. This thermal refinement is carried out subsequent to the hot forging and is followed by turning. By the thermal refinement, a layer of at least 2 mm in depth from a surface of the outer member 1, then rendered to be a product, is sufficiently hardened to form a complete martensite structure and is subsequently rendered to be a micro-pearlite structure by means of the high temperature tempering process. In other words, the layer of at least 2 mm in depth from the surface of the outer member 1 rendered to be the product has no structure, mixed therein, other than the micro-pearlite structure which is a thermally refined structure.

After the turning, an induction heat treatment or induction hardening is carried out to each of the raceway surfaces 3 of the outer member 1 over a predetermined depth that is required, to thereby form a hardened layer 3a of a predetermined depth in each of the raceway surfaces 3. This hardened layer 3a in each of the raceway surfaces 3 has a hardness within the range of 58 to 64 HRC and any other portion of the outer member 1 than those raceway surfaces 3 has a hardness within the range of 15 to 35 HRC. In order that the tensile strength and the impact resistance and the turning capability of the outer member 1 as a product can be compatible with each other, that portion of the outer member 1 other than the raceway surfaces 3 has the hardness preferably within the range of 20 to 30 HRC and more preferably within the range of 20 to 25 HRC.

According to the wheel support bearing assembly of the construction described hereinabove, since the outer member 1 forming the stationary member is thermally refined by means of the quenching treatment and the high temperature tempering process, the toughness of the outer member 1, particularly that exhibited at a low temperature, can be increased. As a result, the resistance characteristic to the impact load can be increased. In other words, the load leading to impairment against the impact load can be increased. In this way, in the event that the automotive vehicle skids and lateral side or vehicle wheels thereof shockingly collide sidewise against the curbside, even though the impact load is loaded on the wheel support bearing assembly, failure of the automotive vehicle to run with the wheel support bearing assembly in its entirety separated from the automotive body structure and the possibility of the vehicle wheel separated and then rolling to collide against an external object can be avoided.

Figure 3:
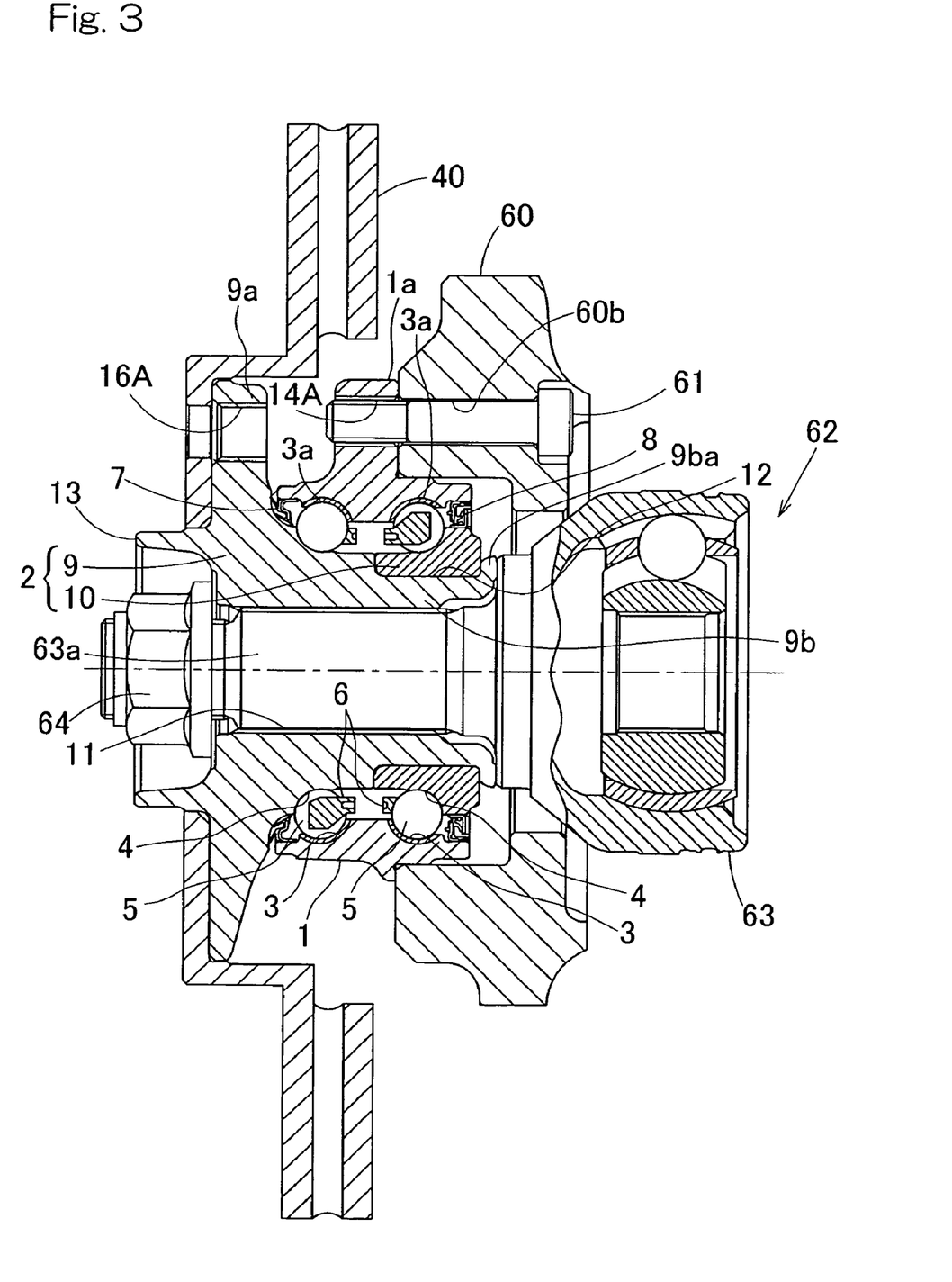
FIG. 3 is a sectional view showing a wheel support bearing assembly according to a second preferred embodiment of the present invention.
Figure 4:
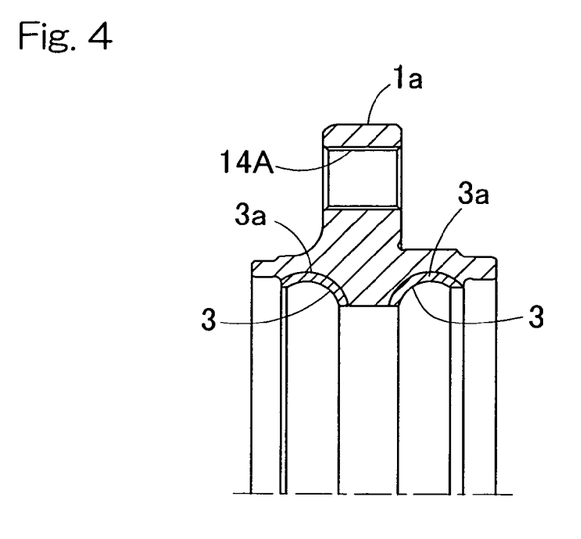
FIG. 4 is a fragmentary enlarged sectional view showing the outer member of the wheel support bearing assembly in FIG. 3.

FIGS. 3 and 4 illustrate a second preferred embodiment of the present invention. In this second embodiment, an inboard end of the shank portion 9b of the hub axle 9 in the wheel support bearing assembly of the structure shown and described with reference to FIGS. 1 and 2 in connection with the first embodiment is formed with a crimped portion 9ba for fixedly crimping the inner ring 10. By clamping the inner member 2 together with this crimped portion 9ba between the nut 64, threadingly mounted on the stem portion 63a tip of the outer ring 63 of the constant velocity universal joint 62, and a cup portion of the constant velocity universal joint 62, the wheel support bearing assembly and the constant velocity universal joint 62 are connected together.

Also, in this embodiment, female screw holes 14A are provided at a plurality of circumferential locations of the vehicle body fitting flange 1a of the outer member 1 and, by threading knuckle bolts 61, which are vehicle body fastening bolts inserted from the inboard side through respective bolt insertion holes 60b in the knuckle 60, into the corresponding female screw holes 14A in the flange 1a, the flange 1a is bolted to the knuckle 60. The hub flange 9a is provided with a bolt insertion hole 16A defined at a plurality of circumferential locations for the hub bolt (not shown). By threading the hub bolts from the outboard side into the respective bolt insertion holes 16A, the brake rotor 40 and the vehicle wheel overlapped to the hub flange 9a are fixed to the hub flange 9a. Other structural features are generally similar to those shown in and described with particular reference to FIGS. 1 and 2 in connection with the first embodiment of the present invention and the details are not therefore reiterated.

Figure 5:
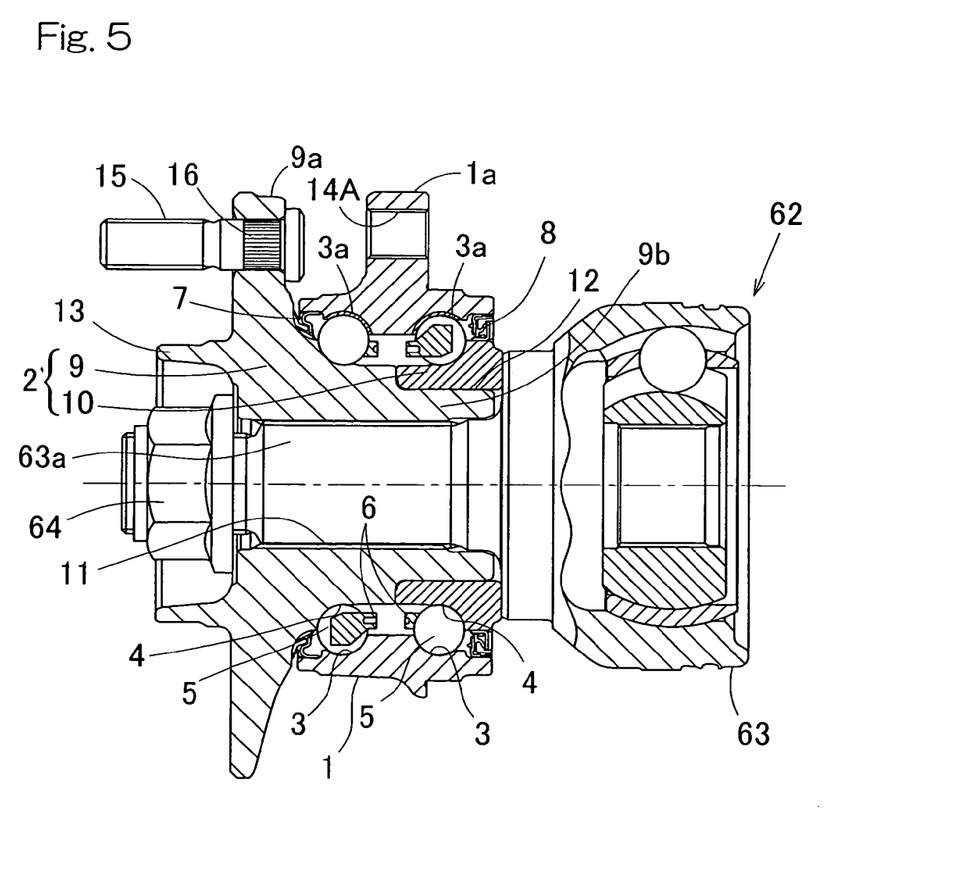
FIG. 5 is a sectional view showing a wheel support bearing assembly according to a third preferred embodiment of the present invention.

FIG. 5 illustrates a third preferred embodiment of the present invention. In this third embodiment, vehicle body fitting female screw holes 14A are defined at a plurality of circumferential locations of the vehicle body fitting flange 1a of the outer member 1 described as employed in the wheel support bearing assembly according to the first embodiment shown in FIGS. 1 and 2, and by threading the knuckle bolts (not shown), which are vehicle body fastening bolts inserted from the inboard side through respective bolt insertion holes (not shown) in the knuckle (not shown), into the corresponding female screw holes 14A in the flange 1a, the flange 1a is bolted to the knuckle. Other structural features are generally similar to those shown in and described with particular reference to FIGS. 1 and 2 in connection with the first embodiment of the present invention.

Figure 6:
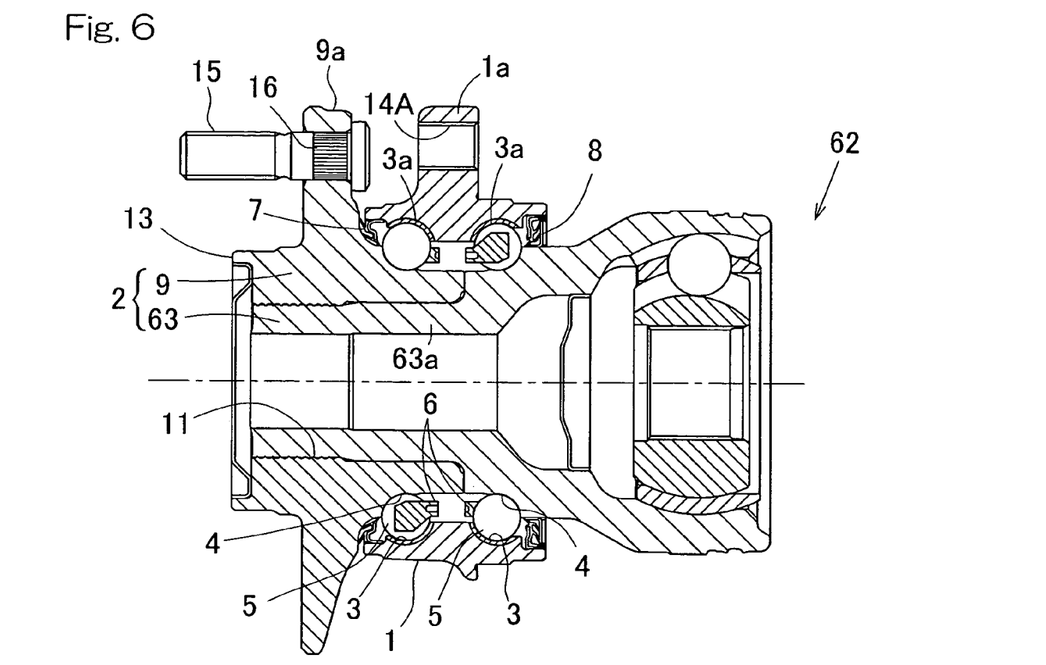
FIG. 6 is a sectional view showing a wheel support bearing assembly according to a fourth preferred embodiment of the present invention.

FIG. 6 illustrates a fourth preferred embodiment of the present invention. The wheel support bearing assembly according to this fourth embodiment is a double row angular contact ball bearing model, which is classified as a fourth generation type, and is an inner ring rotating type for supporting a vehicle drive wheel. The inner member 2 includes the hub axle 9 and the outer ring 63 of the constant velocity universal joint 62 that is inserted into and engaged in the throughhole 11 in the hub axle 9, and the plurality of the rows of the raceway surfaces 4 that are opposed to the raceway surfaces 3 of the outer member 1 are formed respectively in the hub axle 9 and the stem portion of the constant velocity universal joint outer ring 63. The hub axle 9 is connected with the constant velocity universal joint outer ring 63 by means of a diametric expansion crimping of the stem portion of the constant velocity universal joint 63 that is rendered to be in the form of a hollow shaft. Also, the inboard sealing unit 8 is interposed between an inner diametric surface of the outer member 1 and an outer diametric surface of the constant velocity universal joint outer ring 63. Vehicle body fitting female screw holes 14A are defined at a plurality of circumferential locations of the vehicle body fitting flange 1a of the outer member 1, and by threading the knuckle bolts (not shown), which are vehicle body fastening bolts inserted from the inboard side through respective bolt insertion holes (not shown) in the knuckle (not shown), into the corresponding female screw holes 14A in the flange 1a, the flange 1a is bolted to the knuckle. Other structural features are generally similar to those shown in and described with particular reference to FIGS. 1 and 2 in connection with the first embodiment of the present invention.

Figure 7:
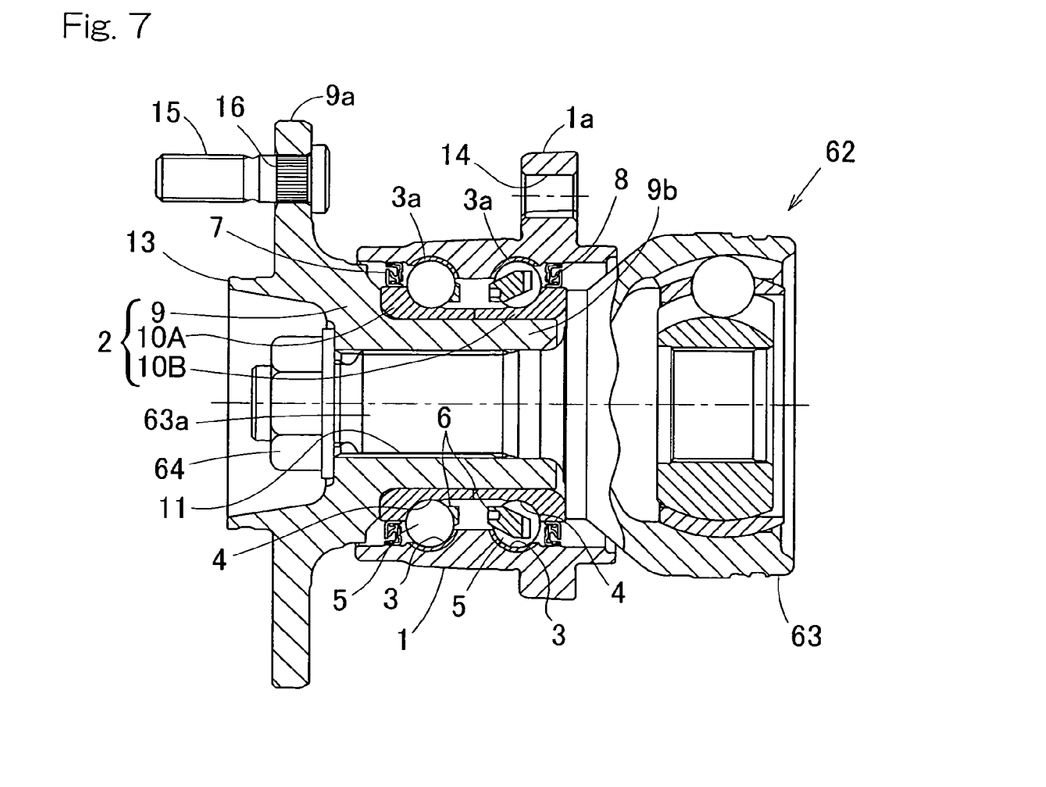
FIG. 7 is a sectional view showing a wheel support bearing assembly according to a fifth preferred embodiment of the present invention.

FIG. 7 illustrates a fifth preferred embodiment of the present invention. The wheel support bearing assembly according to this fifth embodiment is a double row angular contact ball bearing model, which is classified as a second generation type, and is an inner ring rotating type for supporting a vehicle drive wheel. The inner member 2, which forms the rotatable member, includes a hub axle 9 and two rows of inner rings 10A and 10B press fitted onto a shank portion 9b of the hub axle 9 in axially juxtaposed relation to each other. The rows of the raceway surfaces 4 are formed respectively on outer peripheries of the two rows of the inner rings 10A and 10B. Other structural features are generally similar to those shown in and described with particular reference to FIGS. 1 and 2 in connection with the first embodiment of the present invention.

Figure 8:
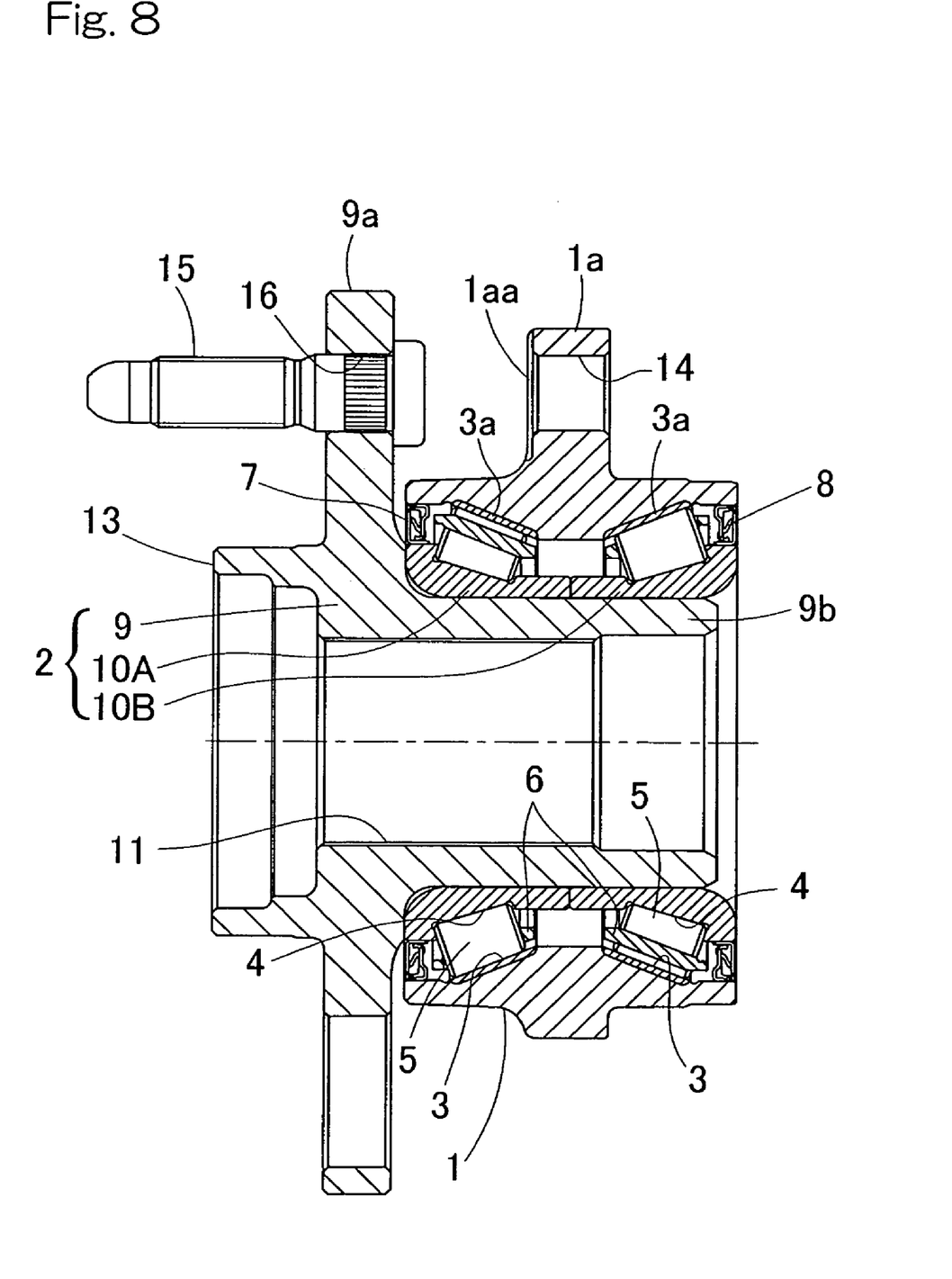
FIG. 8 is a sectional view showing a wheel support bearing assembly according to a sixth preferred embodiment of the present invention.

FIG. 8 illustrates a sixth preferred embodiment of the present invention. The wheel support bearing assembly according to this sixth embodiment is a double row tapered roller bearing model, which is classified as a second generation type, and is an inner ring rotating type for the support of a vehicle drive wheel. This wheel support bearing assembly is similar to that according to the fifth embodiment shown in and described with particular reference to FIG. 7, but differs therefrom in that the balls, forming the rolling elements 5, are replaced with tapered rollers. Also, even in this embodiment, bolt insertion holes 14 for bolting the flange 1a from the outboard side to the knuckle (not shown) are provided in the vehicle body fitting flange 1a of the outer member 1, but a side surface of the flange 1a oriented towards the outboard side is provided with a turned surface 1aa which defines a seat surface for the knuckle bolt (not shown). In place of the turned surface 1aa, a portion that defines the seat surface may be rendered to be a countersunken surface. The countersinking process to form the countersunken surface is one of cutting techniques. In FIG. 8, the constant velocity universal joint outer ring 63 shown in FIG. 7 is not illustrated, but other structural features are similar to those employed in the fifth embodiment shown in and described with particular reference to FIG. 7.

Figure 9:
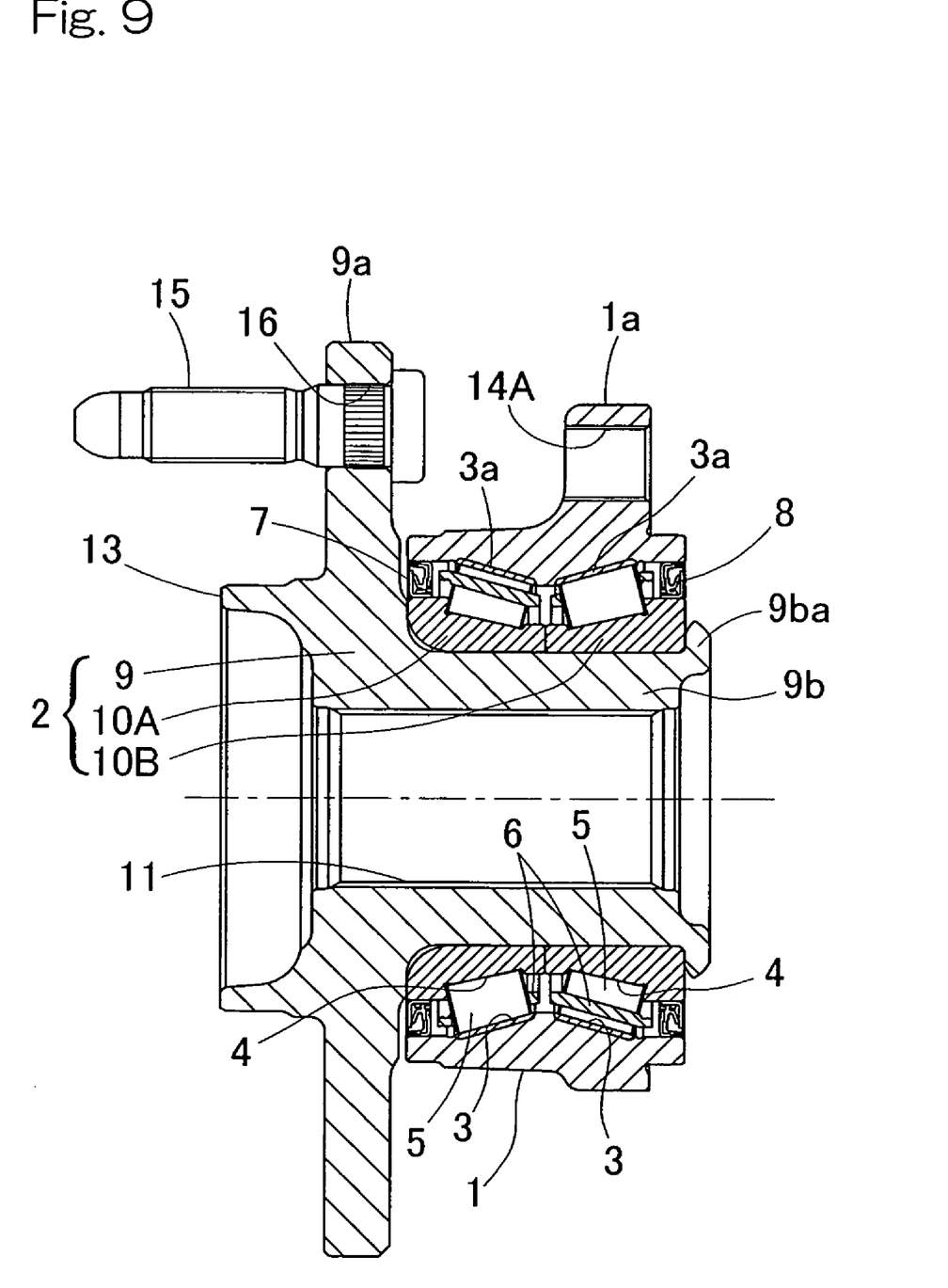
FIG. 9 is a sectional view showing a wheel support bearing assembly according to a seventh preferred embodiment of the present invention.

FIG. 9 illustrates a seventh preferred embodiment of the present invention. This wheel support bearing assembly according to the seventh embodiment is similar to that according to the sixth embodiment shown in and described with particular reference to FIG. 8, but differs therefrom in that a crimped portion 9ba for fixedly crimping the inner rings 10A and 10B to the inboard end of the shank portion 9b of the hub axle 9 is formed. Also, in this embodiment, the vehicle body fitting female screw holes 14A are provided at a plurality of circumferential locations of the vehicle body fitting flange 1a of the outer member 1, and by threading the knuckle bolts (not shown), which are vehicle body fastening bolts inserted from the inboard side through respective bolt insertion holes (not shown) in the knuckle (not shown), into the corresponding female screw holes 14A in the flange 1a, the flange 1a is bolted to the knuckle. Other structural features are generally similar to those shown in and described with particular reference to FIG. 8 in connection with the sixth embodiment of the present invention.

Figure 10:
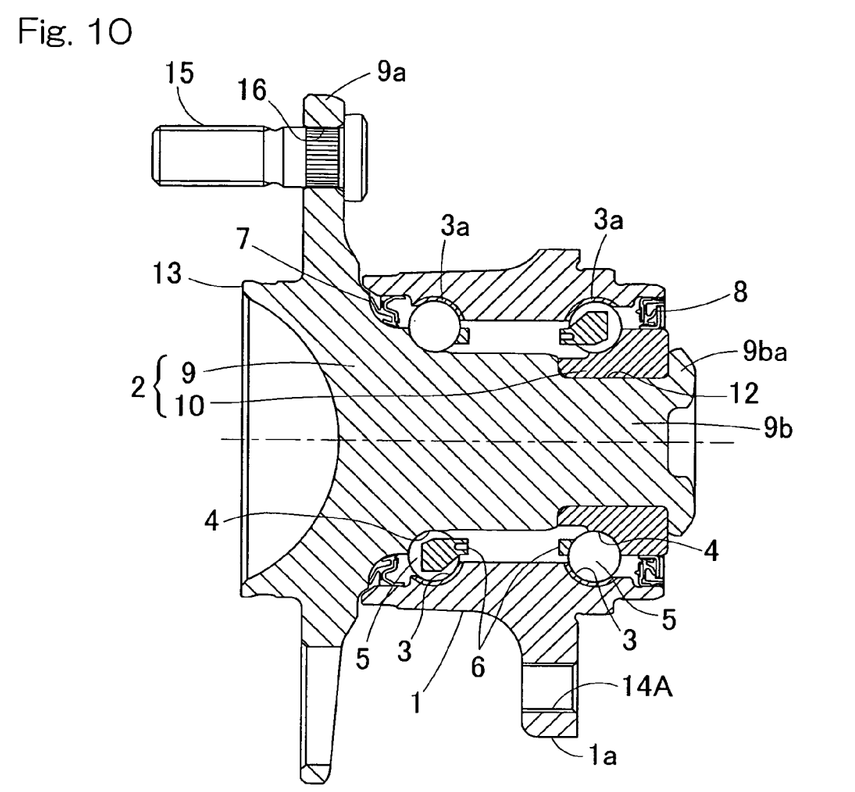
FIG. 10 is a sectional view showing a wheel support bearing assembly according to an eighth preferred embodiment of the present invention.

FIG. 10 illustrates an eighth preferred embodiment of the present invention. The wheel support bearing assembly according to this eighth embodiment is a double row angular contact ball bearing model that is classified as a third generation type, and is an inner rotating type for the support of a vehicle driven wheel. The inner member 2, forming the rotatable member, includes a hub axle 9 having the wheel mounting flange 9a, and an inner ring 10 mounted on the outer periphery of the inboard end of the shank portion 9b of the hub axle 9, and a crimped portion 9ba for fixedly crimping the inner ring 10 is formed in the inboard end of the shank portion 9b of the hub axle 9. The hub ring 9 is of a solid structure and has no throughhole such as the throughhole 11 employed in the second embodiment shown in FIG. 3, and the constant velocity universal joint outer ring is not connected to the wheel support bearing assembly. Other structural features are similar to those employed in the second embodiment shown in and described with particular reference to FIGS. 3 and 4.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention.

Accordingly, such changes and modifications are, unless they depart from the scope of the present invention as delivered from the claims annexed hereto, to be construed as included therein.

What is claimed is:

1. A wheel support bearing assembly for rotatably supporting a vehicle wheel relative to a vehicle body structure, which comprises:
    an outer member, which serves as a stationary member and has an inner periphery formed with a plurality of rows of raceway surfaces;
    an inner member, which serves as a rotatable member and has an outer periphery formed with respective raceway surfaces opposed to the previously described raceway surfaces;
    a plurality of rows of rolling elements interposed between the respective opposed raceway surfaces;
    in which the outer member is thermally refined by quenching and high temperature tempering such that a layer of at least 2 mm in depth from a surface of the outer member is rendered to have a micro-pearlite structure.

2. The wheel support bearing assembly as claimed in claim 1, in which the outer member has the outer periphery provided with a vehicle body fitting flange, which has female screw holes defined therein for bolting from an inboard side to the vehicle body structure.

3. The wheel support bearing assembly as claimed in claim 1, in which the outer member has the outer periphery provided with a vehicle body fitting flange, which has bolt insertion holes defined therein for bolting from an outboard to the vehicle body structure and a turned surface or a countersunken surface which defines a seat surface of a vehicle body fastening bolt.

4. The wheel support bearing assembly as claimed in claim 1, in which the outer member is made of medium carbon steel or a steel material having a chemical composition corresponding to the medium carbon steel and has the raceway surfaces hardened over a predetermined depth by means of an induction hardening which is effected after turning following the thermal refinement that has been performed subsequent to the hot forging.

5. The wheel support bearing assembly as claimed in claim 4, in which the raceway surfaces of the outer member has a hardness within the range of 58 to 64 HRC and the other portion of the outer member has a hardness within the range of 15 to 35 HRC.

6. The wheel support bearing assembly as claimed in claim 1, in which the rolling elements are in the form of balls.

7. The wheel support bearing assembly as claimed in claim 1, in which the rolling elements are in the form of tapered rollers.

* * * * *